United States Patent
Draghetti

(10) Patent No.: US 6,725,997 B2
(45) Date of Patent: Apr. 27, 2004

(54) VARIABLE-CAPACITY STORE FOR OBJECTS

(75) Inventor: Fiorenzo Draghetti, Medicina (IT)

(73) Assignee: G.D Societa' per Azioni, Bologna (IT)

( * ) Notice: Subject to any disclaimer, the term of this patent is extended or adjusted under 35 U.S.C. 154(b) by 0 days.

(21) Appl. No.: 10/188,280

(22) Filed: Jul. 2, 2002

(65) Prior Publication Data

US 2003/0019718 A1 Jan. 30, 2003

(30) Foreign Application Priority Data

Jul. 5, 2001 (IT) .................................... BO2001A0424

(51) Int. Cl.⁷ ................................................ B65G 1/00
(52) U.S. Cl. ..................... 198/347.1; 198/778; 198/812
(58) Field of Search ............................ 198/778, 347.1, 198/812

(56) References Cited

U.S. PATENT DOCUMENTS 6,065,585 A * 5/2000 Bryant et al. ............ 198/347.1

FOREIGN PATENT DOCUMENTS

| EP | 0 738 478 | 10/1996 |
|----|-----------|---------|
| WO | 99/44446  | 9/1999  |

* cited by examiner

Primary Examiner—Christopher P. Ellis
Assistant Examiner—Richard Ridley
(74) Attorney, Agent, or Firm—Ladas & Parry

(57) ABSTRACT

A variable-capacity store for objects, wherein an endless conveyor defines a conveying branch, for conveying a mass of objects, and a return branch, which respectively form a first and a second spiral of given lengths, each of which coils about a respective fixed first drum and a respective second drum movable to and from the relative first drum; and wherein the second drums are located on the same side with respect to the relative first drums, and are connected to each other by a transmission powered by a single reversible motor to equally and oppositely adjust the distances between the second drums and the relative first drums.

12 Claims, 3 Drawing Sheets

VARIABLE-CAPACITY STORE FOR OBJECTS

The present invention relates to a variable-capacity store for objects.

More specifically, the present invention relates to a variable-capacity store for objects defined, for example, by elongated elements, and of the type comprising an input station and an output station located in series along a feed path of the elongated elements; an endless conveyor comprising a conveying branch, for feeding said elongated elements along said path, and a return branch, which respectively form a first and a second spiral of given lengths about respective pairs of guide drums; and adjusting means for adjusting said lengths in complementary manner; said pairs of drums each comprising a fixed first drum, and a second drum movable to and from the relative first drum; and said second drums being located on the same side with respect to the relative first drums.

The present invention may be used to advantage for storing cigarettes, to which the following description refers purely by way of example.

BACKGROUND OF THE INVENTION

For storing cigarettes, a store of the type defined above, and as described for example in EP 0738478, is interposed between a cigarette manufacturing machine and a packing machine to compensate for any difference between the number of cigarettes produced and the number of cigarettes packed, by lengthening or shortening the first or conveying spiral, and by shortening or lengthening the second or return spiral in complementary manner.

To move one of the two movable drums away from the relative fixed drum and move the other movable drum towards the relative fixed drum in complementary manner, known stores of the above type normally employ two independent reversible motors controlled by a single central control unit sensitive to any difference between the number of cigarettes produced and the number packed.

In known stores of the above type, the two motors, which must be operated simultaneously and in relation to each other, may give rise to both functional and mechanical problems, and in any case involve relatively high production and maintenance costs.

SUMMARY OF THE INVENTION

It is an object of the present invention to provide a store of the above type, designed to eliminate the aforementioned drawbacks.

According to the present invention, there is provided a variable-capacity store for objects, the store comprising an input station and an output station located in series along a feed path of the objects; an endless conveyor comprising a conveying branch, for feeding said objects along said path, and a return branch, which respectively form a first and a second spiral of given lengths about respective pairs of guide drums; and adjusting means for adjusting said lengths in complementary manner; said pairs of drums each comprising a fixed first drum, and a second drum movable to and from the relative first drum; said second drums being located on the same side with respect to the relative first drums; and the store being characterized in that said adjusting means comprise a transmission connecting said second drums and for moving the second drums equally and oppositely with respect to the relative first drums; and a reversible motor for powering said transmission.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
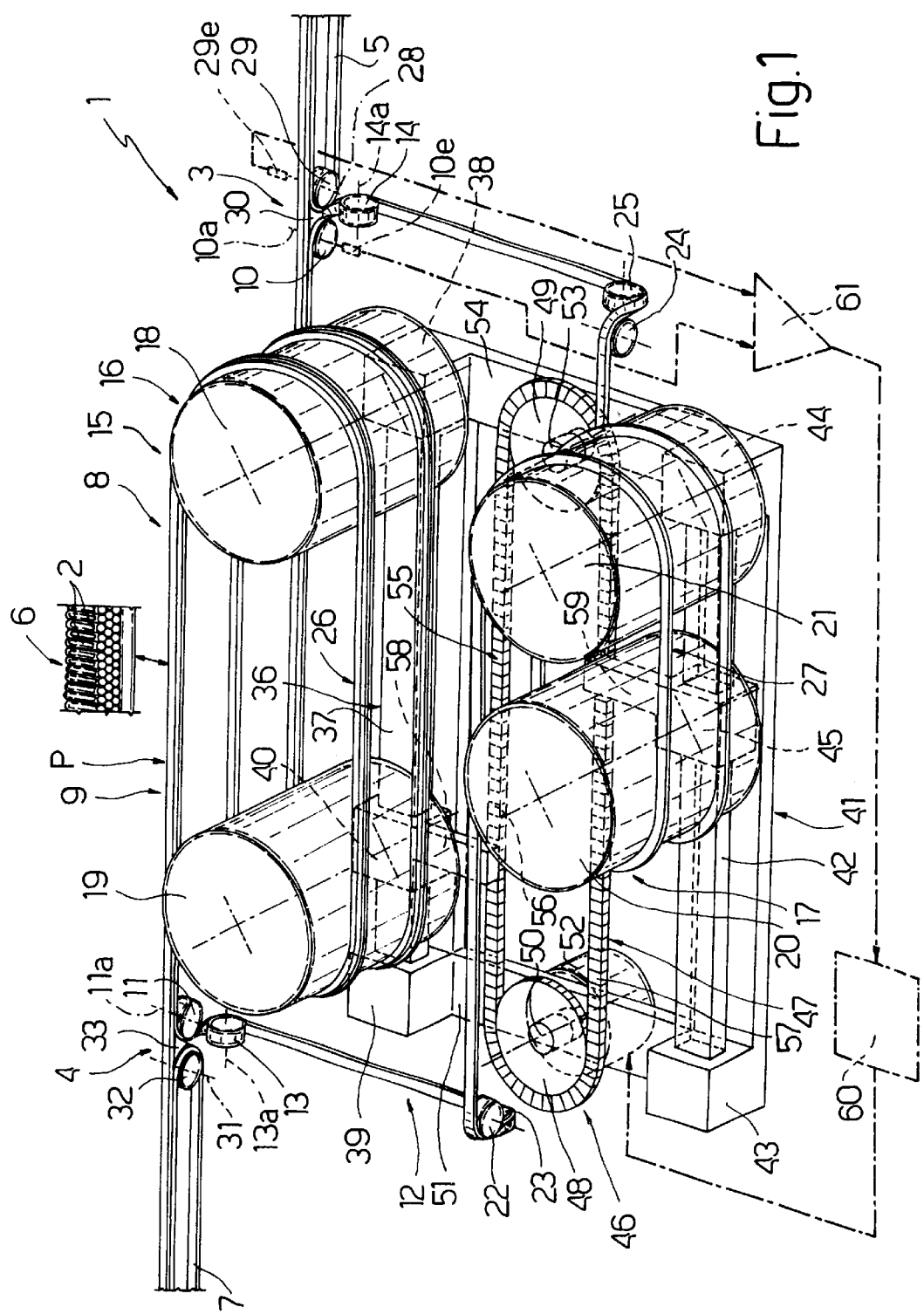
FIG. 1 shows a view in perspective, with parts removed for clarity, of a first preferred embodiment of the store according to the present invention.

Number 1 in FIG. 1 indicates as a whole a variable-capacity store for objects defined, for example, by elongated elements 2, in particular for cigarettes, and comprising, for elements 2, an input station 3 and an output station 4 located in series along a feed path P of elements 2. More specifically, store 1 provides for storing a number of elements 2 varying as required with a given range, and for feeding elements 2 to station 4 in the same order in which they are fed, in use, into store 1 at station 3.

From an output conveyor 5 forming part of a manufacturing machine (not shown) and located at station 3, store 1 receives a number of elements 2 arranged in bulk in a continuous stream 6, and feeds elements 2 to an input conveyor 7 forming part of a packing machine (not shown) and located at station 4.

Store 1 also comprises an endless conveyor 8, in turn comprising a conveying branch 9 extending between an input pulley 10 at station 3 and an output pulley 11 at station 4 to convey elements 2 from station 3 to station 4, and a return branch 12 extending between an input pulley 13 at station 4 and an output pulley 14 at station 3.

Store 1 also comprises an adjusting assembly 15 for adjusting a length L1 of conveying branch 9 and a length L2 of return branch 12 in complementary manner to adjust the storage capacity of store 1, and which comprises two transmission assemblies 16 and 17. Assembly 16 is associated with conveying branch 9, and comprises two transmission drums 18 and 19 located between pulleys 10 and 11; assembly 17 is associated with return branch 12, and comprises two transmission drums 20 and 21; drum 20 is closer to pulley 13, and receives return branch 12 via two transmission pulleys 22 and 23; and drum 21 is closer to pulley 14, and feeds return branch 12 to pulley 14 via two transmission pulleys 24 and 25.

Conveyor 8 is a belt conveyor, which forms a first spiral 26 of a given pitch P1 about drums 18 and 19 of transmission assembly 16, and a second spiral 27 of a given pitch P2—in this case, equal to P1—about drums 20 and 21 of transmission assembly 17.

Pulleys 10 and 14 are located at input station 3 and mounted for rotation about respective perpendicular axes 10a and 14a, of which axis 10a is parallel to an axis 28 of a transmission pulley 29 of conveyor 5. Pulleys 10 and 29 are bridged at the top by a supporting plate 30 for supporting elements 2 entering store 1, and have respective encoders 10e and 29e for measuring their angular operating speed. Pulleys 11 and 13 are located at output station 4 and mounted for rotation about respective perpendicular axes 11a and 13a, of which axis 11a is parallel to both axis 10a and an axis 31 of a transmission pulley 32 of conveyor 7. Pulleys 11 and 32 are bridged at the top by a supporting plate 33 for supporting elements 2 leaving store 1, and are powered in known manner so as to have the same surface speeds in use. More specifically, pulley 11 provides for activating conveyor 8.

Figure 2:
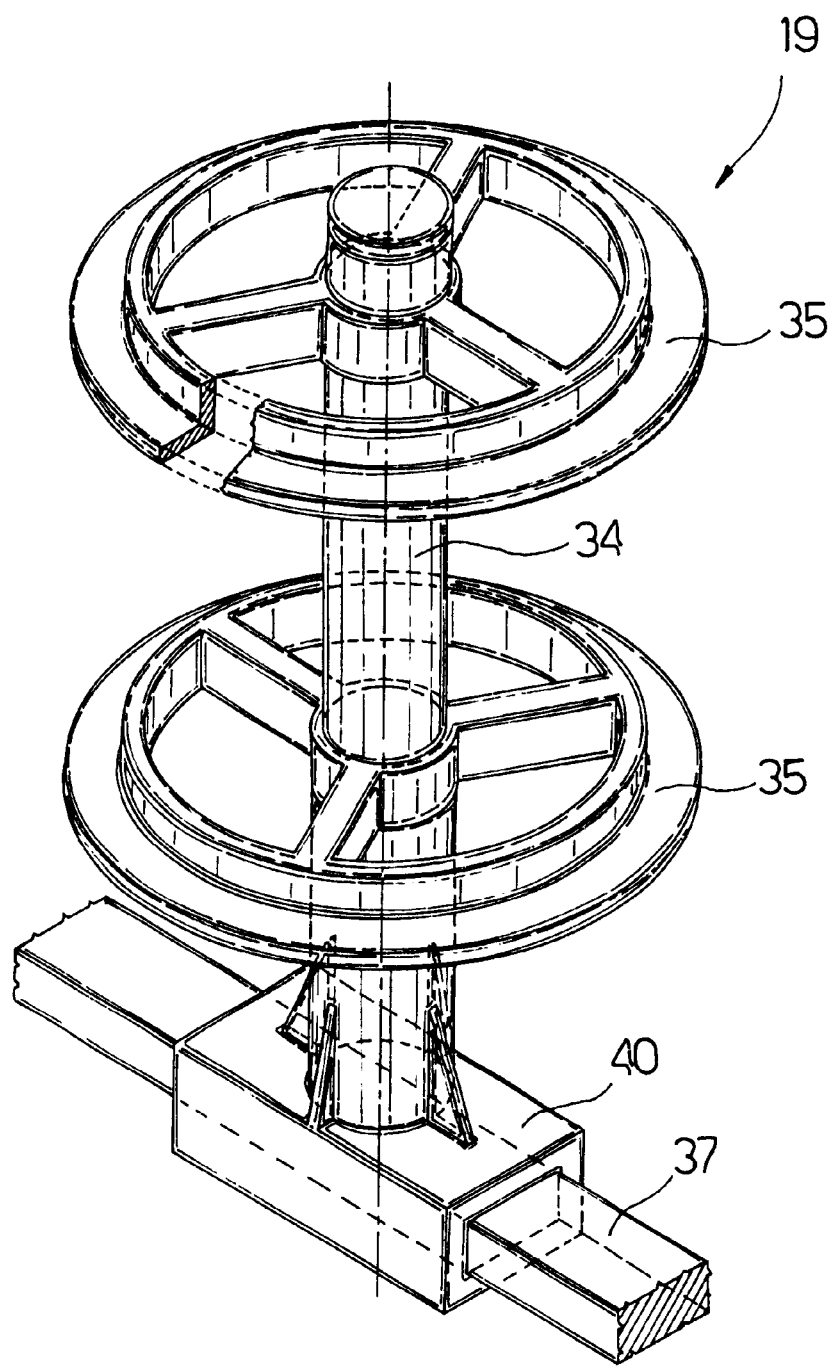
FIG. 2 shows a larger-scale view in perspective of a detail in FIG. 1.

As shown in FIG. 2 (which relates to drum 19, which has the same structure as the other drums 18, 20, 21), each drum 18–21 comprises a respective substantially vertical shaft 34; and a number of respective rims 35, each of which is fitted idly to respective shaft 34 and, together with another rim 35 fitted idly to the other shaft 34 in the same transmission assembly 16, 17, supports a relative coil of relative spiral 26, 27.

Transmission assembly 16 comprises a support 36, in turn comprising a substantially horizontal guide 37 extending between two blocks 38 and 39; block 38 supports shaft 34 of drum 18 in fixed manner; while shaft 34 of drum 19 is carried by a slide 40 mounted to run along guide 37. Similarly, transmission assembly 17 comprises a support 41 located alongside support 36, and in turn comprising a substantially horizontal guide 42 extending parallel to guide 37 between two blocks 43 and 44; block 44 faces block 38 and supports shaft 34 of drum 21 in fixed manner; while shaft 34 of drum 20 is carried by a slide 45 mounted to run along guide 42.

Adjusting assembly 15 also comprises an actuating device 46 associated with drums 18–21 and for moving drums 19 and 20 in opposite directions along respective guides 37 and 42 to adjust lengths L1 and L2 in complementary manner and therefore the storage capacity of store 1. Actuating device 46 comprises a transmission 47, in turn comprising two pulleys 48 and 49. Pulley 48 is fitted to a shaft 50 parallel to shafts 34, and which in turn is fitted in rotary manner to a cross member 51 connecting blocks 39 and 43, and defines the output shaft of a reversible motor 52 for powering transmission 47; and pulley 49 is fitted in rotary manner to a shaft 53 parallel to shaft 50 and fitted in fixed manner to a cross member 54 connecting blocks 38 and 44. A belt 55, forming part of transmission 47, is looped about pulleys 48 and 49, and comprises two branches 56 and 57 parallel to and alongside respective guides 37 and 42, and connected to respective slides 40 and 45 by an arm 58 and an arm 59 respectively.

In a variation of the present invention, pulleys 48 and 49 may be replaced by toothed wheels also indicated 48 and 49, and about which is looped, instead of belt 55, a chain also indicated 55.

Adjusting assembly 15 also comprises a known central control unit 60 connected to motor 52 and for controlling rotation of pulley 48 so as to move drums 19 and 20 by the same distance but in opposite directions along relative guides 37 and 42. Central control unit 60 is also connected to a comparing circuit 61 for receiving a known signal from each encoder 10e e 29e, and for supplying central control unit 60 with an error signal proportional to the difference between the angular speeds of pulleys 10 and 29 to regulate said movements of drums 19 and 20.

Figure 3:
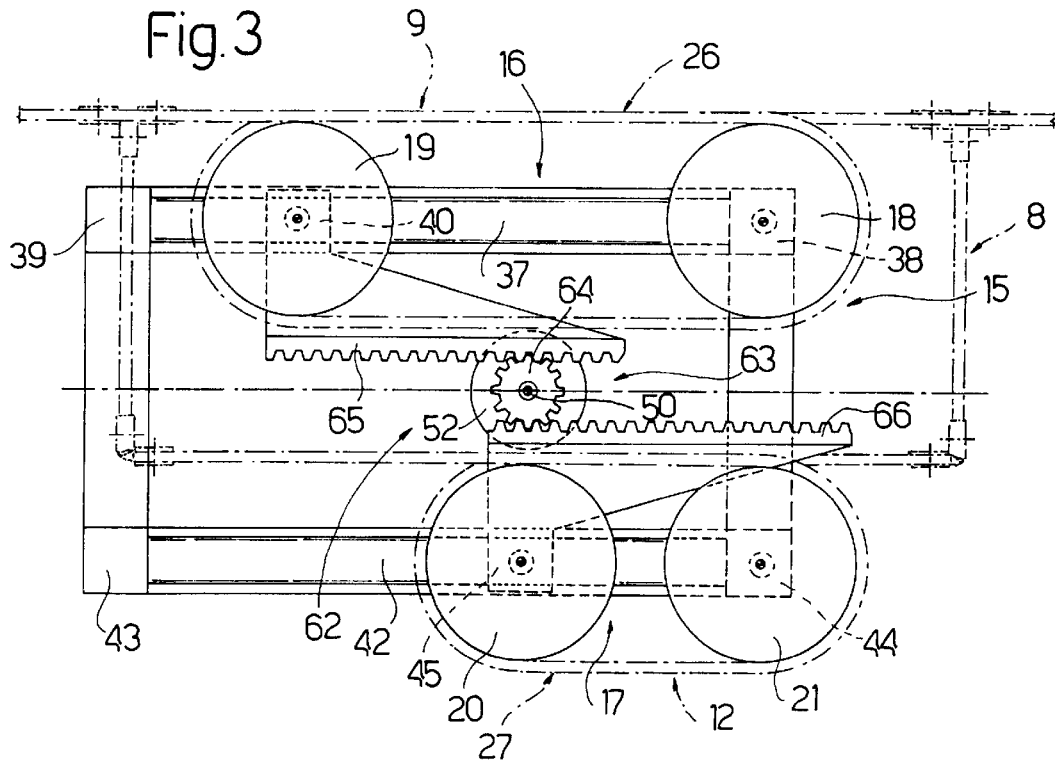
FIGS. 3 and 4 show two schematic plan views, with parts removed for clarity, of a second and, respectively, third preferred embodiment of the store according to the present invention.

In the FIG. 3 variation, actuating device 46 in FIG. 1 is replaced by an actuating device 62, in which vertical shaft 50 of motor 52 is connected to a transmission 63 comprising a pinion 64 fitted to shaft 50 and located centrally between guides 37 and 42; and two racks 65 and 66, which are parallel to guides 37 and 42, are connected to and located on opposite sides of pinion 64, and are integral with arm 58 and arm 59 respectively.

Like actuating device 46, each rotation of pinion 64 of actuating device 62 corresponds to equal and opposite movements of racks 65 and 66, and therefore of drums 19 and 20.

Figure 4:
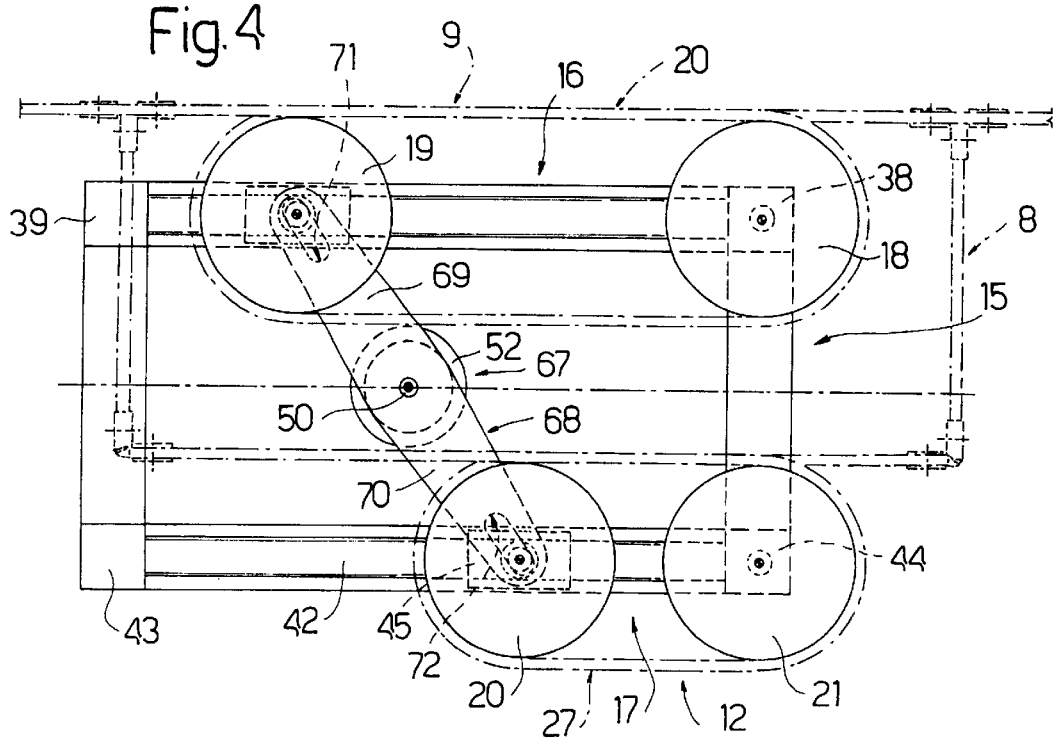

In the FIG. 4 variation, actuating device 46 in FIG. 1 is replaced by an actuating device 67, in which vertical shaft 50 of motor 52 is connected to a transmission 68 defined by a rocker arm fitted to shaft 50 and comprising two arms 69 and 70 of equal length and having, close to their free ends, respective axial slots 71 and 72 engaged in transversely sliding manner by shaft 34 of drum 19 and shaft 34 of drum 20 respectively.

In actual use, elements 2 are fed continuously by conveyor 5 over plate 30 to an input portion of conveying branch 9, and are fed by conveying branch 9 to an output portion of conveying branch 9 located at output station 4, where elements 2 are fed over plate 33 onto conveyor 7 in the same order in which they arelfed into store 1.

In normal operating conditions, the number of elements 2 fed by conveyor 5 to input station 3 equals the number of elements 2 absorbed by conveyor 7 at output station 4, and said output portion of conveying branch 9 has the same linear speed as conveyor 5. Comparing circuit 61 therefore supplies central control unit 60 with a zero error signal, so that motor 52 remains idle, and therefore the distances between drums 19, 20 and respective drums 18, 21 remain unchanged.

When the number of elements 2 fed to input station 3 is greater than the number of elements 2 absorbed at output station 4, comparing circuit 61 sends an error signal to central control unit 60, which activates motor 52, and therefore transmission 47, 63, 68, so as to move drum 19 away from drum 18, and move drum 20 towards drum 21 by a distance depending on the difference between the number of incoming and outgoing elements. Moving drum 19 away from drum 18 increases the storage capacity of store 1, but requires that conveying branch 9 wound about drums 18 and 19 be lengthened accordingly; the amount of conveyor 8 required to compensate which is provided by moving drum 20 towards drum 21.

Conversely, when the number of elements 2 fed to input station 3 is less than the number of elements 2 absorbed at output station 4, comparing circuit 61 sends an error signal to central control unit 60, which activates motor 52, and therefore transmission 47, 63, 68, so as to move drum 19 towards drum 18, and move drum 20 away from drum 21 by a distance depending on the difference between the number of incoming and outgoing elements. Moving drum 19 towards drum 18 reduces the storage capacity of store 1, but requires that conveying branch 9 wound about drums 18 and 19 be shortened accordingly, so the surplus amount of conveyor 8 is absorbed by moving drum 20 away from drum 21.

What is claimed is:

1. A variable-capacity store for objects, the store (1) comprising an input station (3) and an output station (4) located in series along a feed path (P) of the objects (2); an endless conveyor (8) comprising a conveying branch (9), for feeding said objects (2) along said path (P), and a return branch (12), which respectively form a first and a second spiral (26, 27) of given lengths about respective pairs (16, 17) of guide drums (18, 19; 20,21); and adjusting means (46; 62; 67) for adjusting said lengths in complementary manner; said pairs (16, 17) of drums (18, 19; 20, 21) each comprising a fixed first drum (18; 21), and a second drum (19; 20) movable to and from the relative first drum (18; 21); said second drums (19, 20) being located on the same side with respect to the relative first drums (18, 21); said adjusting means (46; 62; 67) comprising only one reversible motor (52) and a mechanical transmission (47; 63; 68) connecting both said second drums (19, 20) to the motor (52) for moving the second drums (19, 20) equally and oppositely with respect to the relative first drums (18, 21) by operation of said only one reversible motor (52).

2. A store as claimed in claim 1, wherein each said second drum (19; 20) comprises guide means (37; 42) and slide means (40; 45) supporting a respective said second drum (19; 20); said slide means being slidably supported by said guide means (37; 42) to move the respective second drum (19; 20) towards or away from the relative first drum (18; 21); said transmission (47; 63; 68) connecting said slide means (40; 45).

3. A store as claimed in claim 2, wherein said first drums (18, 21) are located side by side, and said guide means (37; 42) extend parallel to each other from the relative said first drums (18, 21) and on the same side with respect to the first drums (18, 21).

4. A store as claimed in claim 1, wherein said transmission (47) comprises a belt (55) located between said two pairs (16, 17) of drums and looped about two pulleys (48, 49) to define two branches (56, 57); one (48) of said pulleys (48, 49) being powered by said motor (52); and each said second drum (19; 20) being connected to a respective said branch (56; 57) of said belt (55) 50 as to be moved together with the branch (56; 57) by said motor (52).

5. A store as claimed claim 1, wherein said transmission (47) comprises a chain (55) located between said two pairs (16, 17) of drums and looped about two toothed wheels (48, 49) to define two branches (56, 57); one (48) of said toothed wheels (48, 49) being powered by said motor (52); and each said second drum (19; 20) being connected to a respective said branch (56; 57) of said chain (55) so as to be moved together with the branch (56; 57) by said motor (52).

6. A store as claimed claim 1, wherein said transmission (63) comprises a pinion (64) located centrally between said two pairs (16, 17) of drums; and two racks (65, 66) located on opposite sides of said pinion (64) and connected to the pinion (64); said pinion (64) being powered by said motor (52); and each said second drum (19; 20) being connected to a respective said rack (65; 66) 50 as to be moved with the rack (65; 66) by said motor (52).

7. A store as claimed claim 1, wherein said transmission (68) comprises a rocker arm located centrally between said two pairs (16, 17) of drums, and pivoting about a central shaft (50) powered by said motor (52); said rocker arm comprising two arms (69, 70) of equal lengths; and each said arm (69; 70) being connected to a respective said second drum (19; 20).

8. A variable-capacity store for objects, the store (1) comprising an input station (3) and an output station (4) located in series along a feed path (P) of the objects (2); an endless conveyor (8) comprising a conveying branch (9), for feeding said objects (2) along said path (P), and a return branch (12), which respectively form a first and a second spiral (26, 27) of given lengths about respective pairs (16, 17) of guide drums (18, 19; 20, 21); and adjusting means (46; 62; 67) for adjusting said lengths in complementary manner; said pairs (16, 17) of drums (18, 19; 20, 21) each comprising a fixed first drum (18; 21), and a second drum (19; 20) movable to and from the relative first drum (18; 21); said second drums (19, 20) being located on the same side with respect to the relative first drums (18, 21); said adjusting means (46; 62; 67) comprising a transmission (47; 63; 68) connecting said second drums (19, 20) and for moving the second drums (19, 20) equally and oppositely with respect to the relative first drums (18, 21); and a reversible motor (52) for powering said transmission (47; 63; 68); said transmission (47) comprising a chain (55) located between said two pairs (16, 17) of drums and looped about two toothed wheels (48, 49) to define two branches (56, 57); one (48) of said toothed wheels (48, 49) being powered by said motor (52); and each said second drum (19; 20) being connected to a respective said branch (56; 57) of said chain (55) so as to be moved together with the branch (56; 57) by said motor (52).

9. A variable-capacity store for objects, the store (1) comprising an input station (3) and an output station (4) located in series along a feed path (P) of the objects (2); an endless conveyor (8) comprising a conveying branch (9), for feeding said objects (2) along said path (P), and a return branch (12), which respectively form a first and a second spiral (26, 27) of given lengths about respective pairs (16, 17) of guide drums (18, 19; 20, 21); and adjusting means (46; 62; 67) for adjusting said lengths in complementary manner; said pairs (16, 17) of drums (18, 19; 20, 21) each comprising a fixed first drum (18; 21), and a second drum (19; 20) movable to and from the relative first drum (18; 21); said second drums (19, 20) being located on the same side with respect to the relative first drums (18, 21); said adjusting means (46; 62; 67) comprising a transmission (47; 63; 68) connecting said second drums (19, 20) and for moving the second drums (19, 20) equally and oppositely with respect to the relative first drums (18, 21); and a reversible motor (52) for powering said transmission (47; 63; 68); said transmission (47) comprising a chain (55) located between said two pairs (16, 17) of drums and looped about two toothed wheels (48, 49) to define two branches (56, 57); one (48) of said toothed wheels (48, 49) being powered by said motor (52); and each said second drum (19; 20) being connected to a respective said branch (56; 57) of said chain (55) so as to be moved together with the branch (56; 57) by said motor (52).

10. A variable-capacity store for objects, the store (1) comprising an input station (3) and an output station (4) located in series along a feed path (P) of the objects (2); an endless conveyor (8) comprising a conveying branch (9), for feeding said objects (2) along said path (P), and a return branch (12), which respectively form a first and a second spiral (26, 27) of given lengths about respective pairs (16, 17) of guide drums (18, 19; 20, 21); and adjusting means (46; 62; 67) for adjusting said lengths in complementary manner; said pairs (16, 17) of drums (18, 19; 20, 21) each comprising a fixed first drum (18; 21), and a second drum (19; 20) movable to and from the relative first drum (18; 21); said second drums (19, 20) being located on the same side with respect to the relative first drums (18, 21); said adjusting means (46; 62; 67) comprising a transmission (47; 63; 68) connecting said second drums (19, 20) and for moving the second drums (19, 20) equally and oppositely with respect to the relative first drums (18, 21); and a reversible motor (52) for powering said transmission (47; 63; 68); said transmission (63) comprising a pinion (64) located centrally between said two pairs (16, 17) of drums; and two racks (65, 66) located on opposite sides of said pinion (64) and connected to the pinion (64); said pinion (64) being powered by said motor (52); and each said second drum (19; 20) being connected to a respective said rack (65; 66) so as to be moved with the rack (65; 66) by said motor (52).

11. A variable-capacity store for objects, the store (1) comprising an input station (3) and an output station (4)

located in series along a feed path (P) of the objects (2); an endless conveyor (8) comprising a conveying branch (9), for feeding said objects (2) along said path (P), and a return branch (12), which respectively form a first and a second spiral (26, 27) of given lengths about respective pairs (16, 17) of guide drums (18, 19; 20, 21); and adjusting means (46; 62; 67) for adjusting said lengths in complementary manner; said pairs (16, 17) of drums (18, 19; 20, 21) each comprising a fixed first drum (18; 21), and a second drum (19; 20) movable to and from the relative first drum (18; 21); said second drums (19, 20) being located on the same side with respect to the relative first drums (18, 21); said adjusting means (46; 62; 67) comprising a transmission (47; 63; 68) connecting said second drums (19, 20) and for moving the second drums (19, 20) equally and oppositely with respect to the relative first drums (18, 21); and a reversible motor (52) for powering said transmission (47; 63; 68); said transmission (68) comprising a rocker arm located centrally between said two pairs (16, 17) of drums, and pivoting about a central shaft (50) powered by said motor (52); said rocker arm comprising two arms (69, 70) of equal lengths; and each said arm (69; 70) being connected to a respective said second drum (19; 20).

12. A variable-capacity store for objects, the store (1) comprising an input station (3) and an output station (4) located in series along a feed path (P) of the objects (2); an endless conveyor (8) comprising a conveying branch (9) forming a spiral (26) for feeding said objects (2) along said path (P) and a return branch (12) of given lengths about respective guide elements (18, 19; 20, 21); and adjusting means (46; 62; 67) for adjusting said lengths in complementary manner; said guide elements (18, 19; 20, 21) comprising a fixed elements (18; 21), and a movable elements (19; 20) movable to and from the relative fixed elements (18; 21); said movable elements (19, 20) being located on the same side with respect to the relative fixed elements (18, 21); said adjusting means (46; 62; 67) comprising only one reversible motor (52) and a mechanical transmission (47; 63; 68) connecting all said movable elements (19, 20) to the one reversible motor (52) for moving the movable elements (19, 20) equally and oppositely with respect to the relative fixed elements (18, 21) by operation of said only one reversible motor.

* * * * *